(12) United States Patent
Bogner

(10) Patent No.: US 6,648,783 B1
(45) Date of Patent: Nov. 18, 2003

(54) TENSIONING DEVICE FOR TRACTION MEANS SUCH AS BELTS OR CHAINS

(75) Inventor: Michael Bogner, Eckental (DE)

(73) Assignee: INA Wälzlager Schaeffler oHG, Herzogenaurach (DE)

(*) Notice: Subject to any disclaimer, the term of this patent is extended or adjusted under 35 U.S.C. 154(b) by 0 days.

(21) Appl. No.: 09/980,994

(22) PCT Filed: May 10, 2000

(86) PCT No.: PCT/EP00/04162

§ 371 (c)(1),
(2), (4) Date: Dec. 4, 2001

(87) PCT Pub. No.: WO00/77422

PCT Pub. Date: Dec. 21, 2000

(30) Foreign Application Priority Data

Jun. 11, 1999 (DE) .......................................... 199 26 615

(51) Int. Cl.[7] .................................................. F16H 7/12
(52) U.S. Cl. ......................................... 474/134; 474/135
(58) Field of Search ............................... 474/101, 133, 474/134, 135, 140, 151

(56) References Cited

U.S. PATENT DOCUMENTS

| 976,115 A | 11/1910 | Bard ........................... 474/134 |
| 3,580,094 A | * 5/1971 | Kraus ........................... 474/28 |
| 3,811,332 A | * 5/1974 | Brown et al. ................. 474/111 |
| 3,834,477 A | * 9/1974 | Sandow ....................... 180/9.64 |
| 3,930,323 A | * 1/1976 | Marold et al. ................. 37/423 |
| 4,069,719 A | * 1/1978 | Cancilla ....................... 474/134 |
| 4,141,245 A | * 2/1979 | Brandstetter ............... 73/862.46 |
| 4,416,647 A | * 11/1983 | White, Jr. ................... 474/134 |
| 4,744,338 A | * 5/1988 | Sapienza, IV ........... 123/90.15 |
| 4,758,208 A | 7/1988 | Bartos et al. ................ 474/135 |
| 4,768,997 A | * 9/1988 | Page et al. ..................... 474/84 |

FOREIGN PATENT DOCUMENTS

| CH | 1 48 573 | 10/1931 | |
| DE | 42 43 451 A | 6/1994 | |
| DE | 196 31 507 A | 2/1998 | |
| JP | 61024868 A | 2/1986 | |
| JP | 6-94091 | * 4/1994 | ................. 474/134 |
| JP | 06094091 A | 4/1994 | |

\* cited by examiner

Primary Examiner—Thomas R. Hannon
Assistant Examiner—Vicky A. Johnson
(74) Attorney, Agent, or Firm—Henry M. Feiereisen

(57) ABSTRACT

Tensioning device for traction means, such as belts or chains, with a housing-like part in which a tensioning mechanism and a spring elements tensioning the traction means are mounted, whereby the tensioning device can be placed in an assemblage of the traction means drive having a drive shaft so that the tensioning mechanism encompasses the drive shaft, with the housing-like part being disposed so as to prevent rotation, wherein the tensioning mechanism comprises two tensioning arms (7, 8, 26, 27, 47, 49) that are mounted in the housing-like part so as to be able to rotate about axes and with respect to one another, with the tensioning arms being spring-biased by a common spring element (14) that is retained with one end in one tensioning arm and with the other end in the other tensioning arm.

21 Claims, 5 Drawing Sheets

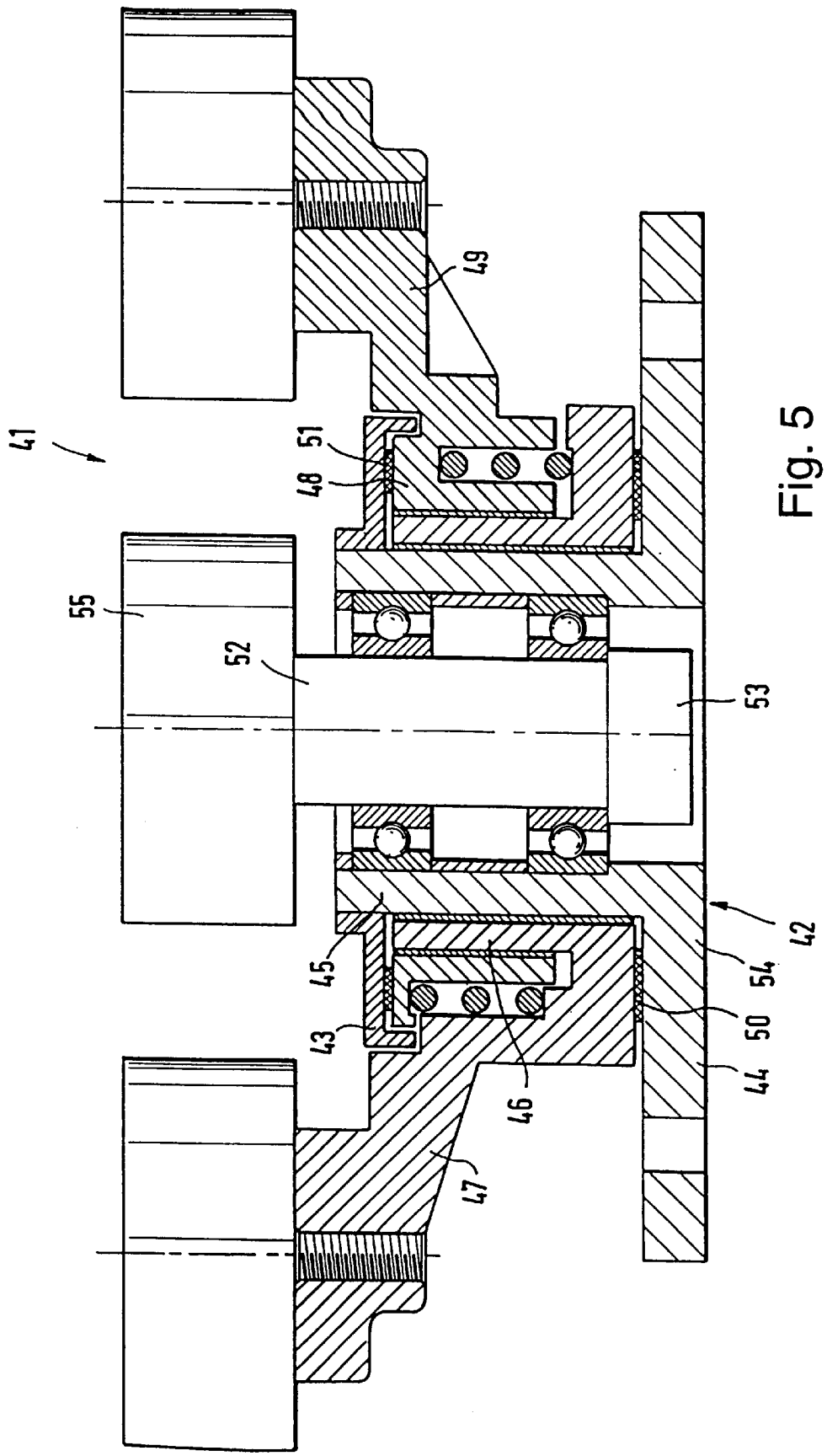

500
TENSIONING DEVICE FOR TRACTION MEANS SUCH AS BELTS OR CHAINS

BACKGROUND OF THE INVENTION

The invention relates to a tensioning device for traction means, such as belts or chains, with a housing-like part, in which a tensioning mechanism and a spring element biasing the tensioning mechanism for tightening the traction means are mounted, whereby the tensioning device can be placed in an assemblage of the traction means drive with a drive shaft so as to encompass the drive shaft, with the housing-like part being arranged so as to prevent rotation.

A tensioning device of this type is known form DE 196 31 507 A1. The tensioning mechanism described therein includes a lever and a tensioning wheel, wherein the lever is received in a cup-shaped housing part which also houses a spring element in form of a helical torsion spring. One end of the spring is supported on the housing part which is prevented from rotating when secured in an assemblage that is integrated in the traction means drive, while the other end the spring element acts on a lever, thereby applying a spring force to the lever which can then tighten the traction means guided over the tensioning wheel. The tensioning device described in the above reference is mounted on an assemblage in form of a pump which is driven by the traction means. The traction means run, on one hand, over the tensioning wheel and, on the other hand, over a belt disk. The belt disk is arranged on a drive shaft of the assemblage, with the drive shaft extending through the center of the housing part, and is essentially enclosed by the housing part. This known tensioning device can be used to tighten the traction means on the loose side of the belt which in the aforedescribed embodiment is always located on the same side of the traction means.

Presently, starter generators are developed wherein the traction means are guided, on one hand, over the starter generator and, on the other hand, over the crankshaft of the motor. The starter generator has two functions. Firstly, it allows starting the motor, i.e., it drives the traction means and thereby also the crankshaft via a belt disk. When the motor runs, the starter generator operates as a genuine generator, i.e., it is driven by the driven crankshaft and the traction means. As a result, the location of the loose side of the belt changes depending on the operating mode of the starter generator. With the known tensioning device, however, it is not possible to compensate for this change and to tension the loose side of the belt of the starter generator independent of the operating mode of the starter generator.

The invention is therefore based on the problem to provide a tensioning device which allows tensioning the loose side of the belt depending on the operating mode during torque reversal, for example when used with a starter generator while yet requiring little assembly space at the same time.

SUMMARY OF THE INVENTION

FIG. 1 shows a tensioning device 1 according to the invention arranged on a unit 2, for example a starter generator. The tensioning device 1 includes a cylindrical housing-type part 3 comprised of a bottom section 4, a wall section 5 and a cover section 6. The housing-type part 3 has an essentially C-shaped cross-section which is open towards the outside. Two tensioning arms 7, 8 which can rotate against one another are supported separately in the housing-type part 3. For this purpose, each tensioning arm 7, 8 has an annular bearing section 9, 10. The annular bearing sections 9, 10 of the tensioning arms 7, 8 encompass the wall section 5 of the housing-type part 3 that is prevented from rotating with respect to the unit 2. The bearing section 9 is supported by a sliding bearing or radial bearing 11 directly for rotation on the wall section 5. The bearing section 10 of the tensioning arm 8 has a slightly larger diameter and engages with the bearing section 9, as depicted in FIG. 1. The bearing section 10 is supported by a sliding or radial bearing 12 for rotation relative to the bearing section 9.

The tensioning device of the invention advantageously employs two mutually independent tensioning arms that are preferably supported for rotation in the same plane of the housing-like part and have corresponding tensioning rollers that engage with different sections of the traction means. When the torque of the traction means drive is reversed, one of the spring-loaded tensioning arms will always operate on and tighten the currently loose side of the belt. In this way, the traction means will always be sufficiently tightened even if the torque is reversed, allowing the traction means drive to operate reliably. By supporting the tensioning arms in the housing-like part, which also receives the spring element that biases the two tensioning arms, preferably in form of a helical torsion spring, the tensioning device becomes essentially double-acting and can be referred to as a pendulum tensioner. This tensioning device is sufficiently small, so that the tensioning device of the invention can employed even where space is limited, for example in the engine compartment of an internal combustion engine. The tensioning device of the invention can be prefabricated as a separate, complete assembly which needs only to be mounted on the assemblage, for example the starter generator. The drive shaft of the starter generator needs only to be coupled with the belt disk which may be separate from the pre-mounted tensioning device. The tensioning device of the invention does not only have favorable operating characteristics, but is also easy to manufacture and assemble.

The improvement of the present invention can be particularly advantageous for suppliers that supply systems to automobile manufacturers.

According to a particular embodiment of the invention, each tensioning arm can have an annular bearing section which encompasses a cylindrical wall section of the housing-like part. The bearing section of the first tensioning arm is rotationally supported directly on the cylindrical wall section, and the bearing section of the second tensioning arm engages with and is rotationally supported on the wall section of the first tensioning arm. According to this embodiment, the arms are supported by the annular bearing sections that encompass a wall section. The bearing section of the one arm that has a smaller diameter is supported directly on the wall section. The bearing section of the other arm with a slightly larger diameter meshes with the wall section and is directly supported on the other arm. Since the two bearing sections engage with one another, tilting moments can be reduced. The tensioning arms directly contact one another which advantageously minimizes the space requirements in the plane of the belt. The bearing sections are supported by sliding bearings or radial bearings. Advantageously, the spring element, preferably in the form of a helical torsion spring, can be received in an annular space formed between the intermeshing bearing sections.

Frequently, vibrations occur during the operation of the traction means drive, for example when used on the crankshaft of an internal combustion engine, which can be transmitted by the traction means drive to the other components, in this case for example the assemblage on which the tensioning device of the invention is mounted. According to the invention, these oscillations which can be caused, for example, by imbalances of the crankshaft, can be attenuated by placing a friction or damping element, such as a friction disk or a friction coating, between the housing-like part and a tensioning arm. These elements not only dampen the tensioning system against the surroundings, but provide also internal damping. Advantageously, the spring element disposed between the tensioning arms urges the tensioning arms in an axial direction against the friction or damping elements. Hence, the spring element produces the required tensioning force and/or the required to tensioning torque as well as the required axial pre-tensioning force so as to press the tensioning arms against the friction or damping elements and thereby establish the required damping.

According to the invention, the housing-like part includes a bottom section, a wall section and a cover section, and has an essentially C-shaped cross section which is open towards the outside. For installation of the tensioning device, the cover section or the bottom section can be released, allowing insertion of the tensioning arms and the spring element. These components can be secured by known techniques, for example by using a Seeger circlip ring and the like. Means for preventing rotation can also be provided.

As described above, the tensioning device of the invention is mounted on the assemblage which is integrated in the traction means drive. The tensioning device encompasses the drive shaft whose axis is parallel to the axis or axes of the tensioning device. Since the tensioning device is preferably a prefabricated component, which only needs to be mounted on the assemblage, installation can be facilitated by arranging the housing-like part on a flange that has a fastening collar which can be used to secure the tensioning device on the assemblage. The flange has attachment means in form of bores into which attachment screws and the like can be inserted. The flange is constructed to match the attachment features on the assemblage and fitted during installation on the assemblage. In other words, the flange is the only component which has to be specially designed for attaching the tensioning device on the assemblage.

According to another advantageous embodiment of the invention, the bottom section and the wall section can be formed by a flange adapted to secure the tensioning device on the assemblage. With this arrangement, the attachment flange forms simultaneously a portion of the housing-like part. The annular bearing section of the first tensioning arm is therefore supported directly on the flange, and the bottom of the housing is also closed by the flange. In this embodiment of the invention, the bottom section and the wall section need not be separate components.

As described above, the tensioning device of the invention is mounted on an assemblage integrated in the traction means drive, such as the starter generator, wherein the drive shaft of the assemblage extends through the tensioning device which has a central opening. A belt disk about which the traction means are guided, is mounted on the drive shaft. The belt disk can be a separate component which is mounted on a drive shaft after the tensioning device has been installed. Advantageously, a shaft which supports a belt disk or chain disk can be rotatably supported in an opening located on the housing-like part or on a flange supporting the housing-like part. The opening is adapted to receive the drive shaft of the assemblage, wherein the shaft includes connecting means for providing a revolving connection with the drive shaft of the assemblage. With this arrangement of the tensioning device of the invention, the belt or chain disk is arranged for rotation by a shaft in the opening located on the housing-like part or the flange, thereby forming an integral part of the tensioning device of the invention. During the installation of the tensioning device, only the shaft which supports the belt or chain disk has to be connected with the drive shaft of the assemblage to realize the motional coupling. In other words, the so configured tensioning device represents a completely prefabricated component which includes all necessary elements. The connecting means can preferably be formed as a tooth profile, preferably as an inside profile. Alternatively, a spline profile can be employed.

As described above, when the tensioning device is used with a traction means drive with imbalances, the traction means can perform sudden movements which cause the tensioning arm to move rapidly against the spring force. The tensioning arm is hence essentially pushed out of the way by the strike of the traction means. To prevent the tensioning arm from moving too far and thereby losing contact with the traction means for a significant period of time, each tensioning arm can according to the invention have a limit stop which limits movement of the tensioning arm against the spring force. Moreover, the arrangement according to the invention can advantageously also facilitate the installation by providing each tensioning arm with a limit stop which limits the movement caused by the spring force. In other words, these limit stops prevent the tension of the spring element from being released.

According to yet another embodiment of the invention, the tensioning arms which project outwardly from the housing-like part can be constructed and/or formed so that a cup-shaped belt disk or chain disk which can be secured to the drive shaft or integrated for rotation on the tensioning device, at least partially encompasses the side of the housing-like part. According to this embodiment of the invention, the housing-like part is almost entirely received in the cup-like belt or chain disk. As a result, the required space in the plane of the belt can be further minimized, i.e., the plane of the belt can be moved closer to the assemblage.

The invention is not only directed to a tensioning device, but also to an arrangement forming a part of a traction means drive, in particular a belt drive, which includes a tensioning device of the type described above as well as an assemblage formed as a starter generator on which the tensioning device is arranged.

The invention is also directed to the use of a tensioning device of the aforedescribed type in a traction means drive in conjunction with an assemblage in form of a starter generator integrated in the traction means drive.

BRIEF DESCRIPTION OF THE DRAWINGS

The invention will be described hereinafter with reference to several embodiments illustrated in the drawings.

It is shown in.

DETAILED DESCRIPTION OF PREFERRED EMBODIMENTS

Figure 1:
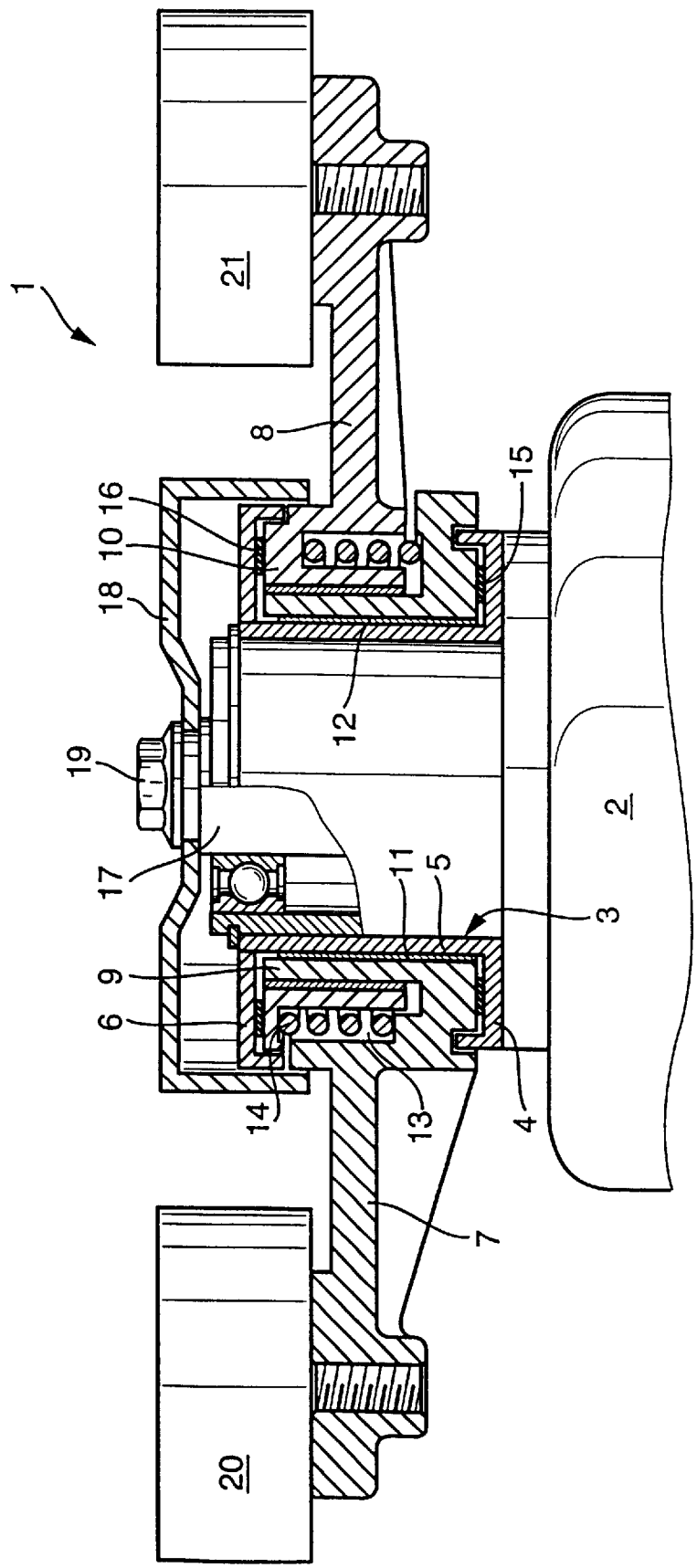
FIG. 1 a cross-sectional view of a first embodiment of a tensioning device according to the invention, FIG. 2 a schematic diagram of a traction means drive with an integrated tensioning device of the invention, FIG. 3 a cross-sectional view of a second embodiment of a tensioning device according to the invention, FIG. 4 a cross-sectional view of a third embodiment of a tensioning device according to the invention, and FIG. 5 a cross-sectional view of a fourth embodiment of a tensioning device according to the invention.

FIG. 1 shows a tensioning device 1 according to the invention arranged on a unit 2, for example a starter generator. The tensioning device 1 includes a cylindrical housing-type part 3 comprised of a bottom section 4, a wall section 5 and a cover section 6. The housing-type part 3 has an essentially C-shaped cross-section which is open towards the outside. Two tensioning arms 7, 8 which can rotate against one another are supported separately in the housing-type part 3. For this purpose, each tensioning arm 7, 8 has an annular bearing section 9, 10. The annular bearing sections 9, 10 of the tensioning arms 7, 8 encompass the wall section 5 of the housing-type part 3 that is prevented from rotating with respect to the unit 2. The bearing section 9 is supported by a sliding bearing or radial bearing 11 directly for rotation on the wall section 5. The bearing section 10 of the tensioning arm 8 has a slightly larger diameter and engages with the bearing section 9, as depicted in FIG. 1. The bearing section 10 is supported by a sliding or radial bearing 12 for rotation relative to the bearing section 9.

A spring element 14, in the present embodiment a helical torsion spring, is received in an annular space 13 formed between or in the region of the bearing sections 9, 10. One end of the spring element is disposed on the tensioning arm 7 or on its corresponding bearing section 9 in a known manner, whereas the other end is disposed on the tensioning arms 8 or on its corresponding bearing section 10. The spring element 14 produces the required tensioning torque and urges the tensioning arms 7, 8 towards one another. The spring element 14 also produces the required axial pretensioning force that urges the tensioning arms 7, 8 or their respective bearing sections 9, 10 against friction or damping elements 15, 16 disposed on the bottom section 4 and the cover section 6. The friction or damping elements 15, 16 can be fixedly connected with the bottom or cover section 4, 6, i.e., the respective bearing section 9, 10 slides over these elements. This dampens of the entire system against the surroundings and also internally. These damping characteristics are relevant for the functionality of the tensioning system.

Figure 2:
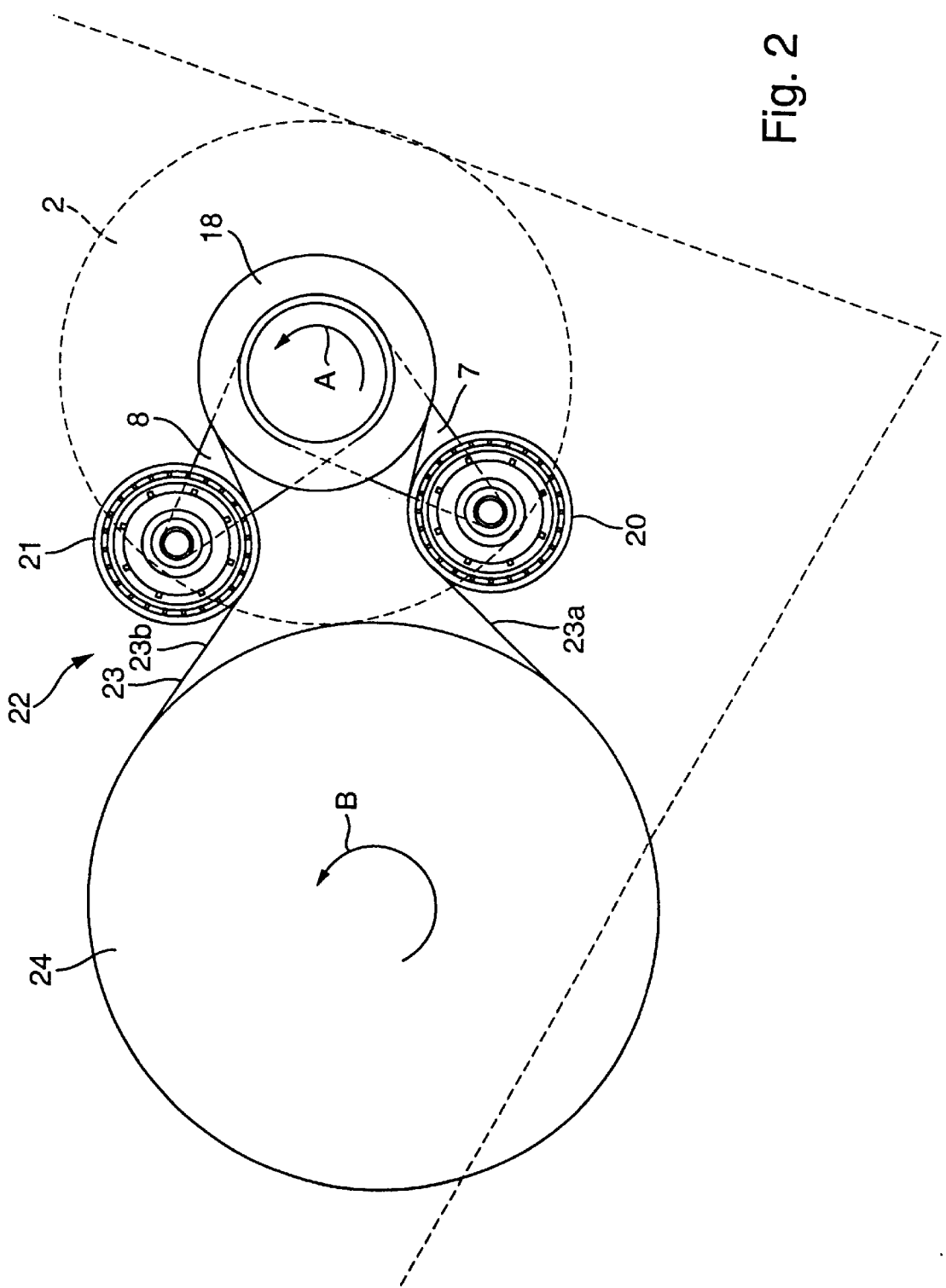

The tensioning device 1 of the invention can be completely preassembled and mounted on the assemblage 2. A drive shaft 17 (not shown) of the assemblage extends through the tensioning device 1 in a corresponding opening, with the axis or axes of the tensioning device 1 aligned parallel to the axis of the drive shaft. A belt or chain disk 18 is secured on the drive shaft 17 with an attachment screw 19. The traction means is guided over this belt or chain disk 18 as well as over the tensioning rollers 20, 21 disposed on the tensioning arms 7, 8, which will be described hereinafter with reference to FIG. 2. As seen in FIG. 2, the belt or chain disk 18 encompasses at least partly the housing-type part 3, so that a small footprint can advantageously be attained. The location of the belt or chain disk may also be lowered by a suitable design of the tensioning arms 7, 8, thereby moving the plane of the belt even closer to the assemblage 2.

FIG. 2 shows in form of a schematic diagram a traction means drive 22, in which the tensioning device 1 of the invention is implemented. Only the tensioning rollers 20, 21 and the tensioning arms 7, 8 of the tensioning device 1 are shown. The traction means 23, for example a belt, is guided over a rotating machine element, for example a crankshaft 24 of an internal combustion engine, and over the belt disk 18 which is located on the drive shaft of the assemblage 2. The two tensioning rollers 20, 21 engage on the outside of the traction means 23 and press the traction means inwardly, whereby the traction means is tightened. The spring element 14 produces the required pressing force.

If the assemblage 2 is, for example, a starter generator, then different operating modes of the starter generator produce different operating conditions in the traction means drive 22. When the starter generator operates as a starter for an internal combustion engine, then the assemblage 2 drives the traction means 23 and hence also the crankshaft 24 via the belt disk 18 (arrow A). This means that the traction means section 23a forms the traction side of the belt and the traction means section 23b the loose (idler) side of the belt. In this case, the idler side of the belt is tightened by the tensioning arm 8 and the tensioning roller 21, respectively. If the starter generator operates as a genuine generator, meaning that the internal combustion engine is running, then the traction means 23 is driven by the crankshaft 24 which rotates in the direction of arrow to B. In this case, the traction means section 23b of the traction means 23 forms the traction side of the belt and the traction means section 23a the idler side of the belt. The idler side of the belt is then tightened by the tensioning arm 7 and the tensioning roller 20, respectively. The tensioning device of the invention can therefore be used to tighten the idler side of the belt in any operating mode regardless which side the idler side is on, i.e., also for torque reversal, where a starter generator is integrated in the traction means operation.

Figure 3:
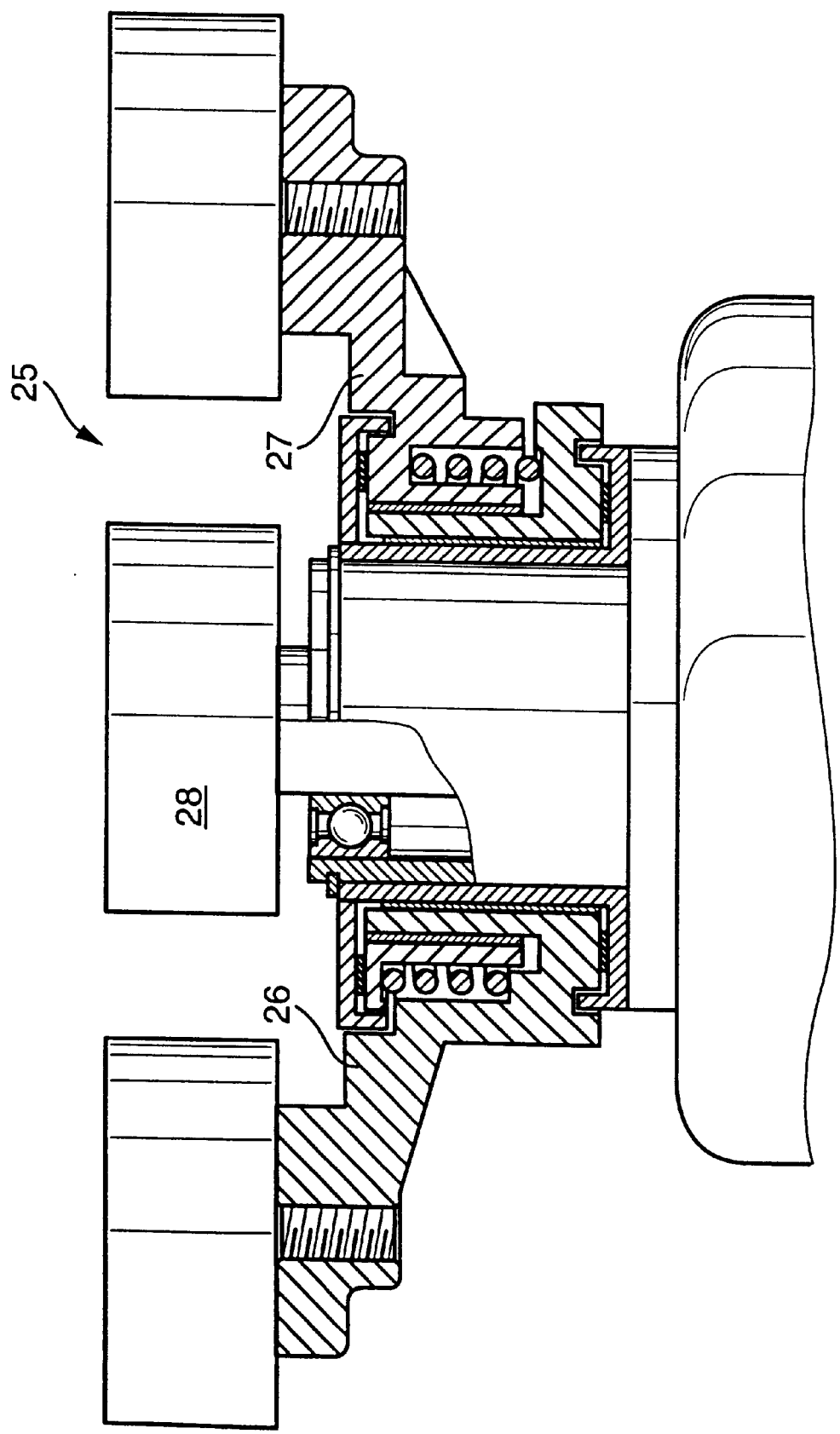

FIG. 3 shows another embodiment of a tensioning device 25 according to the invention. This embodiment is constructed similar to the tensioning device 1, with the exception that the tensioning arms 26, 27 are formed slightly different and are overall shorter. The belt or chain disk 28 is also slightly smaller in comparison to the embodiment of FIG. 1. However, they perform an identical function.

Figure 4:
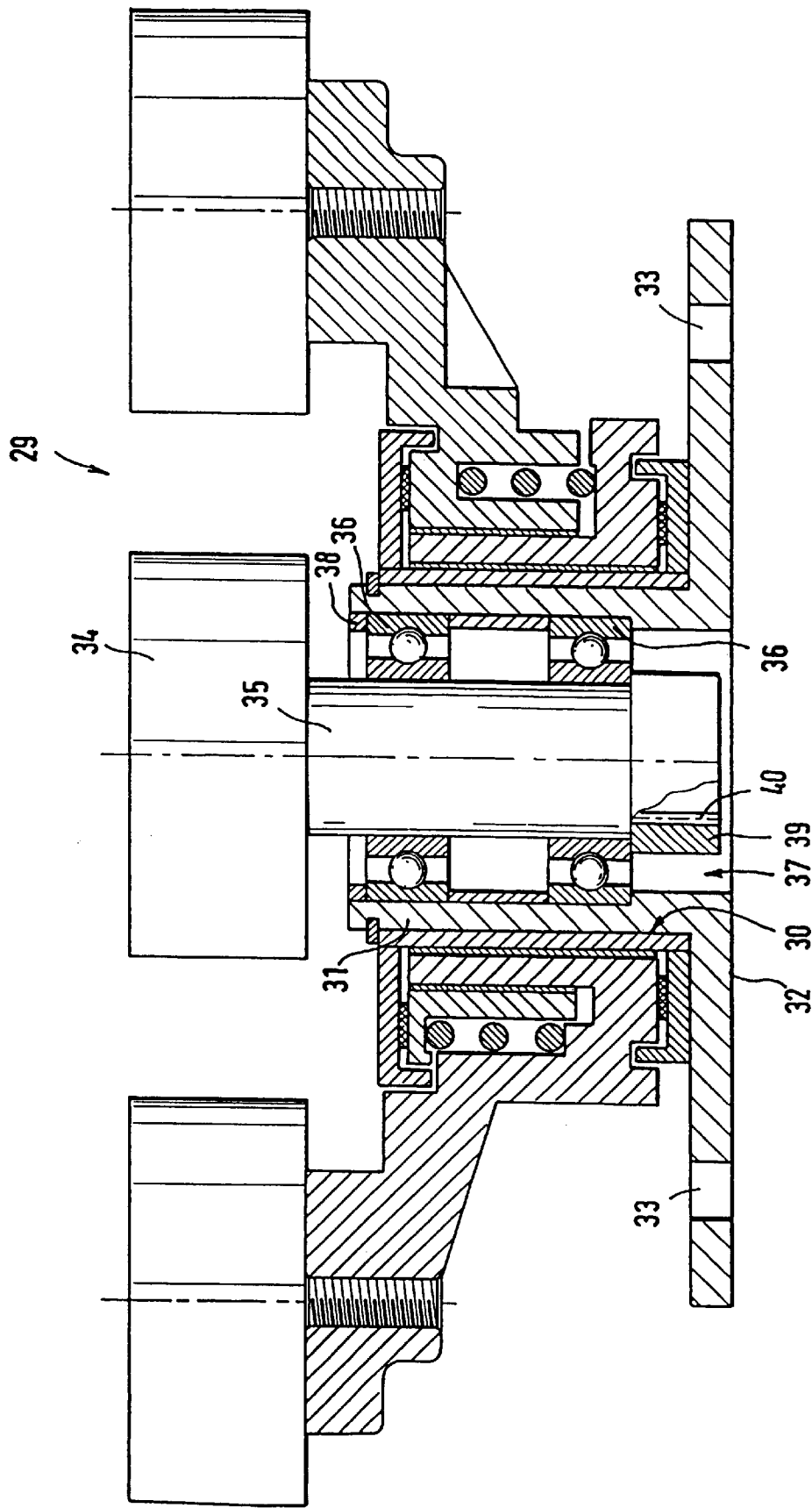

FIG. 4 shows another embodiment of a tensioning device 29 according to the invention. This embodiment is constructed similar to the tensioning device 25, with the exception that the housing-type part 30 is arranged on an attachment collar 31 of a flange 32 on which the housing-type part 30 is mounted. Using this flange 32, which is provided with corresponding attachment bores 33, the entire tensioning device 29 is attached on the respective assemblage as a completely preassembled component. In this embodiment, the belt or chain disks 34 also forms an integral component of the tensioning device 29. The belt or chain disk 34 is supported for rotation in the cylindrical opening 37 formed by the attachment collar 31 by a shaft 35 and corresponding bearings 36 and is fixedly secured in the axial direction by a ring 38. The shaft 35 has an attachment section 39 which has an inner spline profile 40. The attachment section of the corresponding drive shaft of the assemblage 2 has a mating profile which meshes with the profile 40, so that the movement of the drive shaft and shaft 35 are coupled with one another. This represents a simple motion coupling. The entire tensioning device 29 therefore needs to be attached to the assemblage only by the flange 32, whereby the motion coupling with the belt and chain disk is automatically achieved, so that additional measures are no longer required.

FIG. 5 finally shows a fourth embodiment of a tensioning device according to the invention. This embodiment is constructed similar to the aforedescribed tensioning devices, with the housing-type part 42 being formed by the cover section 43 as in the previous embodiments, the exception that the wall section and the bottom section are formed by the flange 54. The horizontal section 44 of the flange 54 in this embodiment forms the bottom section, the vertical attachment collar 45 forms the wall section. The bearing section 46 of the tensioning arm 47, in which the bearing section 48 of the tensioning arm 49 is supported, is rotatably supported on the wall section. In this embodiment, the flange 54 performs several functions, namely on one hand, enabling attachment to the assemblage and, on the other hand, supporting the tensioning arm 47. Like in all the other embodiments, corresponding friction or damping elements 50, 51 are also provided. Likewise, the belt or chain disk 55 is rotatably supported by a shaft 52 directly on the attachment collar 45 of the flange 54 and can be coupled via a corresponding connecting section 53 with the drive shaft (not shown) of the assemblage. In this embodiment, the separate bottom and wall sections of the housing-type part shown in FIG. 4 can be eliminated.

It should also be pointed out that each tensioning device has two limit stops, which are not shown in the drawings for sake of clarity. The limit stops limit the movement of a tensioning arm in a direction opposite to the spring force exerted by the spring element which is present in each embodiment. In this way, the movement of the tensioning arm is limited when the traction means vibrates, preventing the tensioning arm or the tensioning roller from moving away from the traction means by an unacceptable distance. Moreover, the tensioning arms have two limit stops which are not shown in the drawings and can be referred to as assembly stops, to prevent the spring element from relaxing. In other words, before the traction means are installed, the tensioning arms contact the assembly stops. When the traction means are subsequently installed, the tensioning arms are moved apart against the spring force by the pretensioned traction means.

Reference Numerals 1 tensioning device
2 assemblage
3 housing-type part
4 bottom section
5 wall section
6 cover section
7 tensioning arm
8 tensioning arm
9 bearing section
10 bearing section
11 sliding or radial bearing
12 sliding or radial bearing
13 annular space
14 spring element
15 damping element
16 damping element
17 drive shaft
18 belt or chain disk
19 attachment screw
20 tensioning roller
21 tensioning roller
22 traction means drive
23 traction means
23a traction means section
23b traction means section
24 crankshaft
25 tensioning device
26 tensioning arm
27 tensioning arm
28 belt or chain disk
29 tensioning device
30 housing-type part
31 attachment collar
32 flange
33 attachment bore
34 belt or chain disk
35 shaft
36 bearing
37 cylindrical opening
38 ring
39 attachment section
40 inner spline profile
41 tensioning device
42 housing-type part
43 not used
43 flange
44 horizontal section
45 attachment collar
46 bearing section
47 tensioning arm
48 bearing section
49 tensioning arm
50 friction or damping element
51 friction or damping element
52 shaft
53 connecting section*
54 flange
55 belt or chain disk
A, B arrow

What is claimed is:

1. A tensioning device for traction means, comprising:
   a housing non-rotatably secured on an assemblage,
   a spring element having two ends and producing a spring force,
   a tensioning mechanism having two tensioning arms that are spring-biased by the spring element and mounted in the housing so as to be able to rotate with respect to one another and about at least one axis, and
   the assemblage having a drive shaft for driving the traction means, with the tensioning mechanism encompassing the drive shaft,
   wherein the tensioning mechanism and the spring element are disposed in the housing and adapted to tension the traction means, and
   wherein one end of the spring element is retained in one tensioning arm and the other end of the spring element is retained in the other tensioning arm, and
   wherein the tensioning mechanism is prefabricated as a separate complete assembly for installation on the assemblage.

2. The tensioning device of claim 1, wherein the tensioning arms project outwardly from the housing.

3. The tensioning device of claim 1, wherein each tensioning arm has an annular bearing section which encompasses a cylindrical wall section of the housing, wherein the bearing section of the first tensioning arm is rotationally supported directly on the cylindrical wall section and the bearing section of the second tensioning arm is in rotational engagement with the bearing section of the first tensioning arm.

4. The tensioning device of claim 3, further including sliding bearings or radial bearings that support the bearing sections.

5. The tensioning device of claim 3, wherein the spring element is received in an annular space formed between the bearing section of the first tensioning arm and the bearing section of the second tensioning arm.

6. The tensioning device of claim 1, further including a friction or damping element disposed between the housing and at least one of the tensioning arms.

7. The tensioning device of claim 6, wherein the spring element urges the tensioning arms against the friction or damping element in an axial direction.

8. The tensioning device of claim 6, wherein the friction or damping element is a friction disk or a friction coating.

9. The tensioning device of claim 1, wherein the housing includes a bottom section, a wall section and a cover section and has an essentially C-shaped cross section.

10. The tensioning device of claim 9, wherein the housing is arranged on a flange having a fastening collar, with the flange adapted to secure the tensioning device on the assemblage.

11. The tensioning device of claim 9, wherein the bottom section and the wall section are formed by a flange adapted to secure the tensioning device on the assemblage.

12. The tensioning device of claim 1, further comprising a shaft which is rotatably supported in an opening disposed in the housing or in an opening disposed in a flange supporting the housing, wherein a belt disk or chain disk is attached to the shaft and the opening is adapted to receive the drive shaft of the assemblage, and wherein the shaft comprises connecting means for providing a revolving connection with the drive shaft of the assemblage.

13. The tensioning device of claim 12, wherein the connecting means are formed as a tooth profile.

14. The tensioning device of claim 13, wherein the tooth profile is a spline profile.

15. The tensioning device of claim 13, wherein the tooth profile is formed on an inside surface of the shaft.

16. The tensioning device of claim 1, wherein a cup-shaped belt disk or chain disk is secured for rotation on the tensioning device and at least partially encompasses a side portion of the housing.

17. The tensioning device of claim 16, wherein the cup-shaped belt disk or chain disk is secured to the drive shaft.

18. The tensioning device of claim 16, wherein the cup-shaped belt disk or chain disk is integrated with the tensioning device.

19. The tensioning device of claim 1, wherein the assemblage is a starter generator.

20. The tensioning device of claim, 1, wherein the housing comprises a cylindrical housing part having a bottom section, a wall section and a cover section, wherein the wall section is mounted on a cylindrical surface of the assemblage.

21. The tensioning device of claim 1, wherein the housing is disposed on a flange that has a fastening collar adapted to secure the tensioning device on the assemblage.

* * * * *